UNITED STATES PATENT OFFICE.

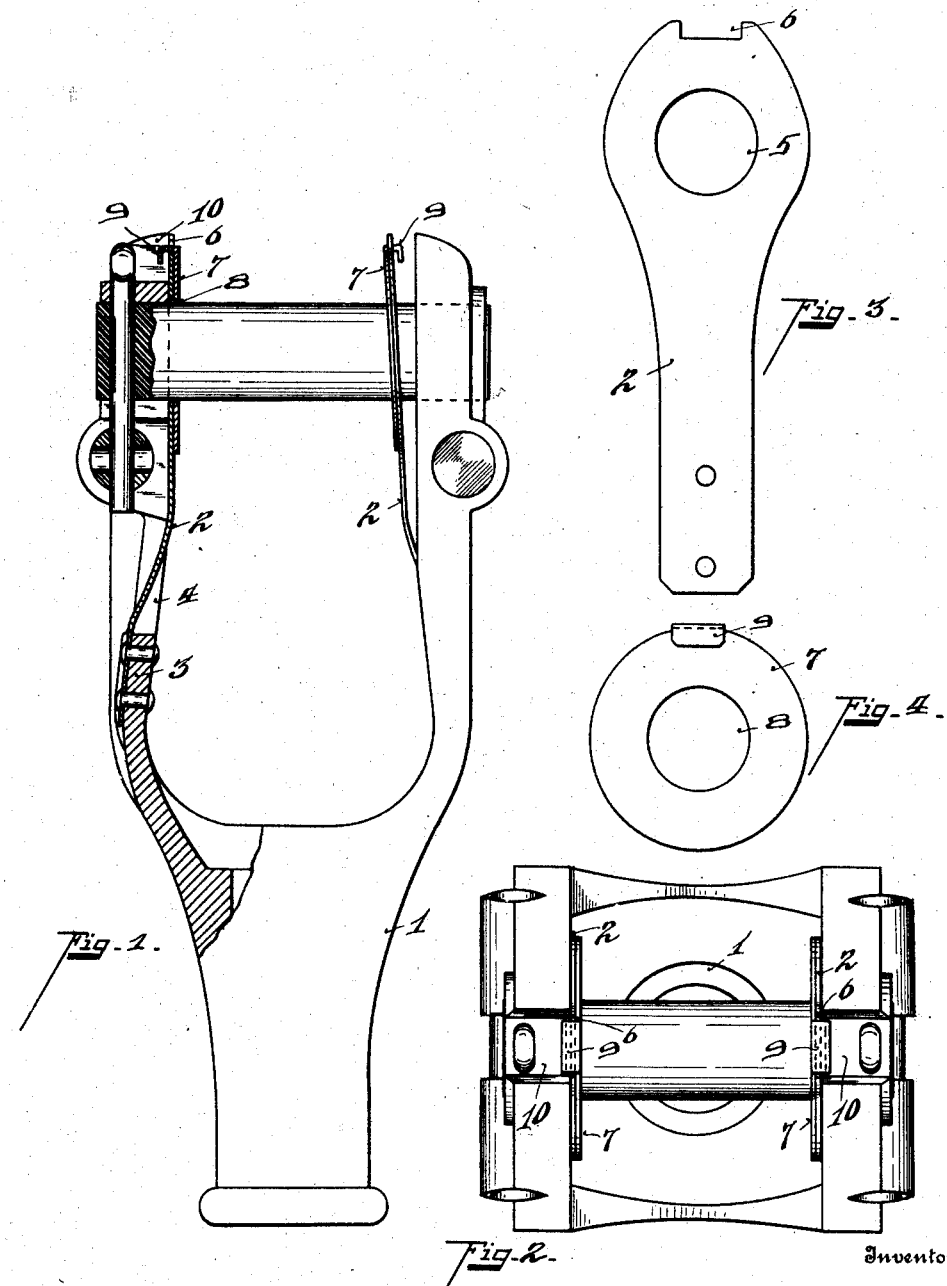

HUGH W. KIMES, OF DAYTON, OHIO, ASSIGNOR OF TWO-THIRDS TO J. H. VAILE, OF DAYTON, OHIO.

TROLLEY-HARP WASHER.

No. 907,246.   Specification of Letters Patent.   Patented Dec. 22, 1908.

Application filed April 20, 1908. Serial No. 428,042.

*To all whom it may concern:*

Be it known that I, HUGH W. KIMES, a citizen of the United States, residing at Dayton, in the county of Montgomery and State of Ohio, have invented certain new and useful Improvements in Trolley-Harp Washers, of which the following is a specification.

My invention relates to an improvement in trolley-harp, the object being to provide means for attaching a washer in a simple and efficient manner.

The features of my invention will be more fully set forth in the description of the accompanying drawing, forming a part of this specification, in which:—

Figure 1 is a front elevation, partly in section. Fig. 2 is a top plan view. Fig. 3 is a plan view of one of the contact plates. Fig. 4 is a plan view of one of the washers.

1 represents the trolley-harp, having the forks provided with an axle orifice, in the usual way.

2 represents the contact plates one for each fork attached to the outside of the fork at 3, extending through the orifice 4 to position upon the inside of the axle orifice. Each plate is provided with an axle orifice 5 and the top notch 6.

7 represents the washer provided with the axle orifice 8 and a hook 9 at the top. The inside top edges of the fork are notched out at 10 adjacent to the notches 6 and the hooks 9.

In Fig. 1 the left hand plate and washer are shown in the position which they occupy when the wheel is in place on the axle. The method of assembling is extremely simple and convenient. The hooks of the washers engage the notches 6 of the contact plates, the axle is then inserted through the alined orifices, the wheel forcing the outer edges of the hooks into the notches 10 of the fork. The washer is thus held securely in place and the hook of the washer engaging through the notches 6 and into the cut out portion of the fork, holds the contact plates against lateral strain.

Having described my invention, I claim:—

In a trolley-harp, a contact plate having an oblong shaped notch in vertical alinement with the axle orifice, a washer provided with a projection extended outwardly and downwardly forming a hook for freely engaging into said notch, and an offset in the fork of the harp for receiving the hook of the washer when the wheel is in position, substantially as described.

In testimony whereof, I have hereunto set my hand.

HUGH W. KIMES.

Witnesses:
WILLMORE B. TURNER,
OSCAR M. GOTTSCHALL.